(12) United States Patent
Jenkel et al.

(10) Patent No.: US 7,984,550 B2
(45) Date of Patent: Jul. 26, 2011

(54) FUEL INJECTOR REMANUFACTURING METHOD AND REMANUFACTURED FUEL INJECTOR

(75) Inventors: Howard D. Jenkel, Laredo, TX (US); James S. Millar, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 1274 days.

(21) Appl. No.: 11/589,429

(22) Filed: Oct. 30, 2006

(65) Prior Publication Data

US 2008/0120840 A1 May 29, 2008

(51) Int. Cl.
*B05B 1/30* (2006.01)

(52) U.S. Cl. ......... 29/890.121; 29/890.142; 29/890.143; 29/402.18; 29/402.06; 29/402.07; 29/402.04

(58) Field of Classification Search ............... 29/402.09, 29/402.16, 402.19, 402.04, 402.05, 402.06, 29/402.07, 890, 890.09, 890.1, 890.142, 29/890.143, 527.6, 530, 888.021, 527.1; 137/15.01

See application file for complete search history.

(56) References Cited

U.S. PATENT DOCUMENTS

| | | | |
|---|---|---|---|
| 4,069,978 A * | 1/1978 | El Moussa | 239/533.2 |
| 4,601,086 A | 7/1986 | Gerlach | |
| 6,434,822 B1 | 8/2002 | Perry et al. | |
| 6,601,300 B2 | 8/2003 | Hasegawa et al. | |
| 2002/0070296 A1 | 6/2002 | Perry et al. | |
| 2007/0084906 A1 * | 4/2007 | Vargas et al. | 228/119 |

* cited by examiner

*Primary Examiner* — David P Bryant
*Assistant Examiner* — Christopher Besler
(74) *Attorney, Agent, or Firm* — Liell & McNeil

(57) ABSTRACT

A remanufacturing and salvaging strategy for fuel injector tips such as high flow fuel injector tips includes blocking a first set of spray orifices in the fuel injector tip, including at least partially filling the first set of spray orifices with a material, for example by laser welding. New spray orifices are formed in virgin material of the fuel injector tip, offset from the former spray orifices, also for example via a laser. A remanufactured fuel injector tip includes blocked former spray orifices as well as new spray orifices configured to permit spraying of fuel from the fuel injector tip.

13 Claims, 3 Drawing Sheets

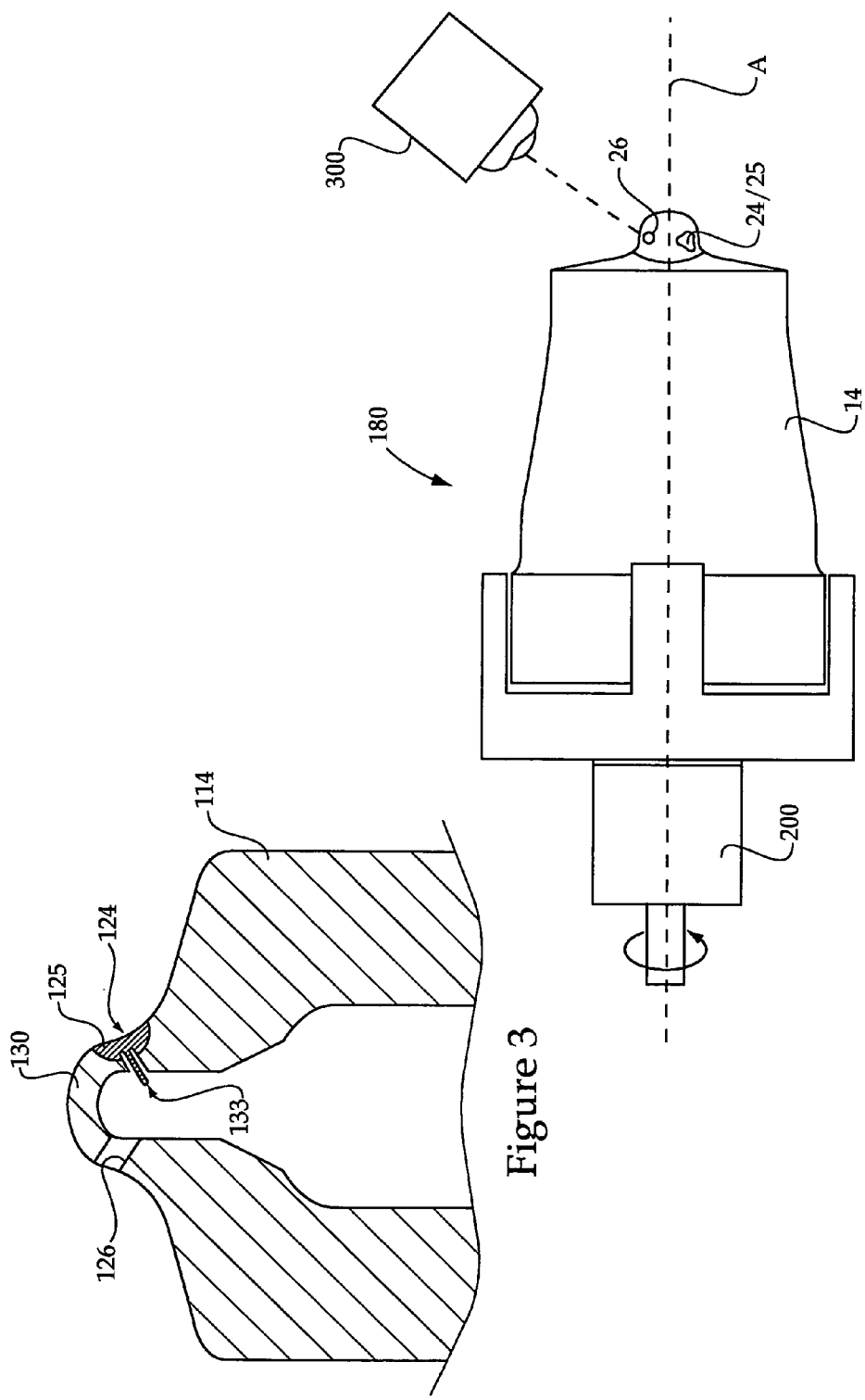

US 7,984,550 B2

FUEL INJECTOR REMANUFACTURING METHOD AND REMANUFACTURED FUEL INJECTOR

TECHNICAL FIELD

The present disclosure relates generally to remanufacturing and salvaging, and relates more particularly to the remanufacturing and salvaging of fuel injectors and fuel injector tips having out-of-specification spray orifices.

BACKGROUND

Fuel injectors are integral components of many modern engine systems, and range in application from use in relatively small portable diesel and gasoline engines to very large power generation and marine propulsion systems. The basic function of a conventional fuel injector is to deliver a relatively precise amount of pressurized fuel into a combustion chamber of an engine at a desired timing. The service life of many fuel injectors is relatively long, on the order of at least thousands of hours. This relatively long duty cycle coupled with the relatively severe operating environment and high fluid pressures associated with fuel injection tend to result in wear on various parts of the injector. Over time, the wear experienced by an injector can affect its performance, and under certain circumstances can even render the injector and its associated engine combustion chamber inoperable.

It is common for certain injectors to become internally clogged via relatively viscous petroleum-derived substances. Fuel injector spray orifices may also become at least partially clogged due to carbonized deposits from high temperature combustion products. When an engine system is dismantled for maintenance or rebuild, the injectors are typically removed, their performance evaluated, and the injectors subsequently cleaned and prepared for further service, or at least partially scrapped. Economic losses associated with scrapping fuel injectors and fuel injector parts have long plagued the engine industry.

Another type of fuel injector performance problem which results in scrapping of a large number of fuel injector parts across the industry relates not to clogging and flow restriction, but to the tendency for injector spray orifices to enlarge. Under certain conditions, spray orifices may become enlarged due to fluid erosion of the inner walls of the orifices. This tendency has been shown to be particularly acute with injectors utilizing relatively higher pressures and flow rates, such as are commonly used in certain larger diesel compression ignition engines. In other words, over the course of many hours of operation, fuel sprayed out of the injector spray orifices under high pressure can erode the inner walls of the spray orifices, increasing orifice size and resulting in excess fuel sprayed into the engine cylinder associated with a particular injector.

Certain injectors which have a tendency to eventually develop a high flow condition can weigh well over twenty pounds, and be quite expensive, particularly due to the extensive and fairly precise machining used in their manufacture. Thus, there is a substantial need in the industry for a means to salvage components of these relatively large, heavy duty and expensive injectors, in particular the fuel injector tips. Certain earlier attempts at remanufacturing fuel injectors involved scrapping many of the injectors and/or parts where only the injector tips were out of specification, and attaching new tips to remanufactured injector bodies.

The present disclosure is directed to one or more of the problems or shortcomings set forth above.

SUMMARY OF THE INVENTION

In one aspect, the present disclosure provides a method of manufacturing a fuel injector, including blocking a first set of spray orifices in a fuel injector tip, which includes at least partially filling the first set of spray orifices with a material. The method further includes forming a new set of spray orifices in the fuel injector tip which are configured to permit spraying of a fuel out of the fuel injector tip, including forming the new set of spray orifices in regions of the fuel injector tip that are spaced from the first set of spray orifices and the material at least partially filling the first set of spray orifices.

In another aspect, the present disclosure provides a method of remanufacturing and salvaging a fuel injector tip having out-of-specification spray orifices. The method includes receiving a fuel injector tip removed from an engine after a service life, the fuel injector tip having a first set of spray orifices with a first average orifice size. The method further includes blocking the first set of spray orifices, including at least partially filling the first set of spray orifices with a material, and forming a new set of spray orifices in the fuel injector tip having a second average orifice size different from the first average orifice size which are configured to permit spraying of a fuel out of the fuel injector tip.

In still another aspect, the present disclosure provides a remanufactured fuel injector tip including an injector tip body having an outer surface, a first end, a second end and a fuel passage extending between the first end and the second end. The injector tip body further includes a set of former spray orifices extending between the fuel passage and the outer surface, having material therein extending at least partially between the fuel passage and the outer surface and blocking fluid flow through the set of former spray orifices. The injector tip body still further includes another set of spray orifices extending between the fuel passage and the outer surface which are configured to permit spraying of a fuel out of the injector tip body, the another set of spray orifices being formed during remanufacturing of the injector tip.

BRIEF DESCRIPTION OF THE DRAWINGS

FIG. 3 is a partial sectioned side view of a fuel injector tip according to another embodiment; and FIG. 4 is a side diagrammatic view of a fuel injector tip shown with a remanufacturing apparatus according to one embodiment.

DETAILED DESCRIPTION

Figure 1:
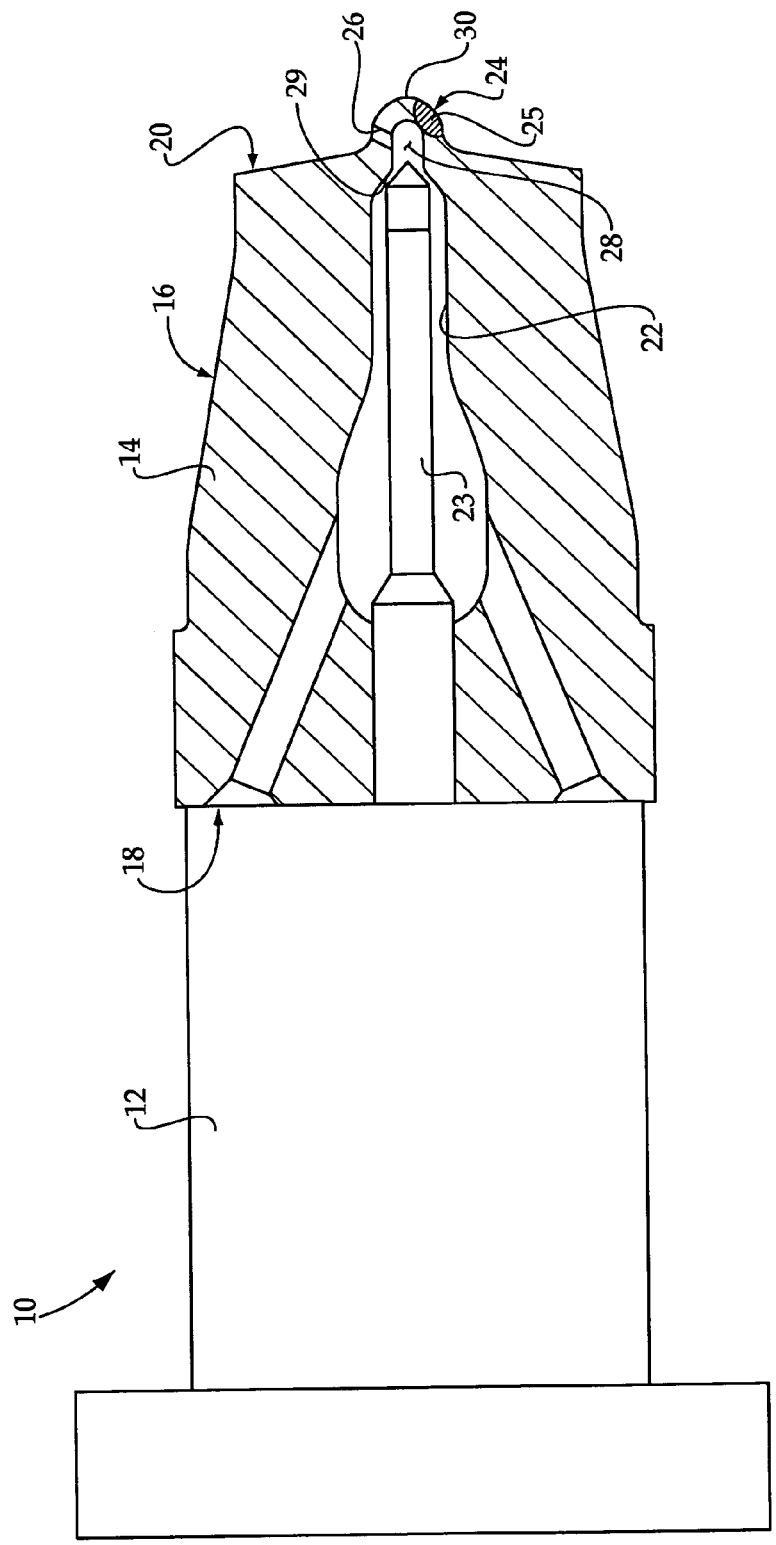
FIG. 1 is a partially sectioned side diagrammatic view of a fuel injector having a remanufactured tip according to one embodiment.

Referring to FIG. 1, there is shown a fuel injector 10 having a remanufactured fuel injector tip 14 according to the present disclosure. Injector 10 includes an injector body 12 coupled with injector tip 14 in a conventional manner. In other embodiments, body 12 and tip 14 might comprise a single part. Injector tip 14 may include a first end 18 and a second end 20 and an outer surface 16. A fuel passage 22 extends between first end 18 and second end 20, and may include a needle valve member 23 reciprocable therein to control fuel injection by moving to a position against, or away from a seat 29. A bulb 30 may be positioned at second end 20 which includes a set of former spray orifices 24 at least partially filled with material 25, and another, "new" set of spray orifices 26. Spray orifices 26 are configured to permit spraying of a fuel supplied via fuel passage 22 out of injector tip 14, for example via a sac 28, thus, spray orifices 26 may extend from sac 28 to outer surface 16 of injector tip 14. Former spray orifices 24 will not permit spraying of fuel from sac 28 out of injector tip body 14, as material 25 such as a welding filler material or another material extends at least partially between outer surface 16 and sac 28 within former spray orifices 24 to block fluid flow therethrough. Blocking former spray orifices 24, then forming new spray orifices 26 in bulb 30 will enable remanufacturing of injector tip 14 and its use in a remanufactured fuel injector in a manner not possible, or at least not practicable, with earlier remanufacturing strategies, substantially reducing the present need to provide new injector tips in remanufactured injectors. Moreover, remanufactured injector 10 may have operating characteristics the same or identical to those when originally placed in service in an internal combustion engine.

It is contemplated that former spray orifices 24 may include a first average diameter that is different from a desired average diameter. Prior to being blocked in the manner described herein, former spray orifices 24 may thus provide an injection flow rate for injector 10 that is different from a desired flow rate. In particular, former spray orifices 24 may include at least one high-flow spray orifice such that injector tip 14 will have a tendency to spray greater fuel quantities into an internal combustion engine cylinder when in service than is desired. Remanufacturing of injector tip 14 as described herein will allow new orifices 26 to be formed which have an average flow rate equal or close to a desired average flow rate for injector 10, typically less than a flow rate associated with former spray orifices 24. To this end, spray orifices 26 may include a second average diameter different from an average diameter of former spray orifices 24, typically a smaller average diameter.

Figure 2:
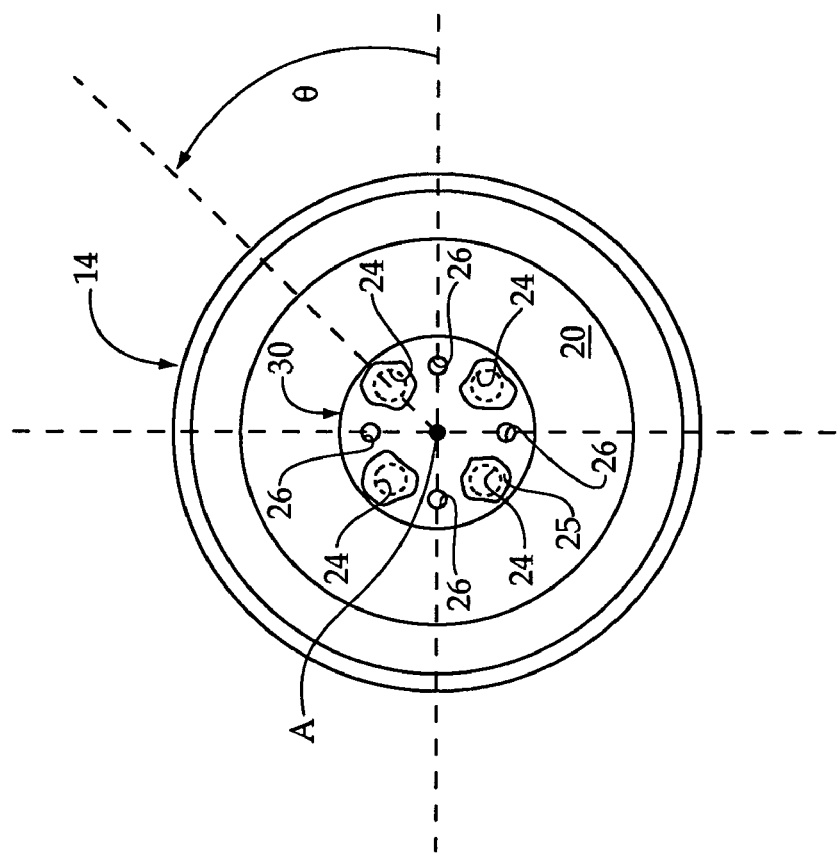
FIG. 2 is an end diagrammatic view of a remanufactured fuel injector tip according to one embodiment.

Turning to FIG. 2, there is shown an end view of injector tip 14, showing new spray orifices 26, and illustrating former spray orifices 24 in phantom, surrounded by welded material blocking the same. It will be noted that the diameter of each of former spray orifices 24 may be greater than the diameter of new spray orifices 26. It may further be noted that former spray orifices 24 are disposed in a first radial pattern about an axis A that extends longitudinally, i.e. in and out of the page in FIG. 2, approximately through a center of injector tip 14. New spray orifices 26 may be disposed in a radial pattern similar to but offset from the radial pattern associated with former spray orifices 24. In other words, drilling or otherwise forming new spray orifices 26 is generally carried out in regions that are spaced from and non-overlapping with former spray orifices 24 and material 25 blocking and surrounding former spray orifices 24. In the illustrated embodiment, four former spray orifices 24 with associated plug welds and four new spray orifices 26 are shown. It should be appreciated, however, that the respective sets of orifices need not include four orifices, or even the same number as one another, nor must the sets of orifices be disposed in similar radial patterns. In a practical implementation strategy, however, injector tip 14 will be returned to service in an application similar or identical to its original application. Thus, to enable approximately the same performance and operation of injector 10 when returned to service with remanufactured tip 14, new spray orifices 26 may include an identical number and distribution to that of former spray orifices 24.

The spacing between orifices 24 and 26 is generally desirable to avoid drilling new spray orifices 26 through material within or surrounding former spray orifices 24. The integrity of new spray orifices 26 when drilled through virgin material of injector tip 14 is generally considered to be superior to their integrity where drilled through material such as filler material or material from which tip 14 is made, which has been melted and permitted to solidify. In the illustrated example, new spray orifices 26 may be radially offset from former spray orifices by an angle θ of approximately 45°, although the relative offset may be different where a greater or lesser number of spray orifices are included in each respective set.

Blocking of former spray orifices 24 may be achieved via a variety of means, including welding former spray orifices 24 shut, introducing a curable material therein and allowing curing, or some other technique. In the context of welding, friction welding such as friction stir welding might be used, conventional arc welding, laser welding, etc. It is contemplated that laser welding former spray orifices 24 shut will provide one practical implementation strategy.

Material 25 may consist at least partially of material from which fuel injector tip 14, and in particular bulb 30, is made. Steel, such as 52100 steel may be used, or any of a variety of other known and/or proprietary materials. Referring to FIG. 3, there is shown a sectioned view of a portion of an injector tip 114 according to an embodiment wherein a welding filler material compatible with the material of injector tip 14, such as a suitable welding wire 133, has been positioned in a former spray orifice 124, then melted along with portions of a bulb 130, and allowed to solidify to form a plug weld within and about a former orifice 124. A tool may be used to machine excess portions of wire 133 or weld flash from an inside and outside of injector tip 114 prior to returning it to service. Similar machining techniques will typically be used with injector tip 14 of FIG. 1. Grinding or polishing of various parts of injector tips 14 and 114 may also be part of the remanufacturing process.

Returning to an embodiment as illustrated in FIG. 1, where feasible it may be desirable to block each of former spray orifices 24 entirely with the same material from which injector tip 14 is made, via melting of material in regions surrounding former spray orifices 24 and permitting the molten material to flow into former spray orifices 24 and solidify to form plug welds therein. Other means for collapsing walls of orifices 24, and at least partially filling them with material of tip 13 may fall within the scope of the present disclosure. Laser welding, however, is contemplated to be particularly well suited to blocking former spray orifices 24 without adding filler material. Those skilled in the art will appreciate that the specific techniques appropriate for welding shut or otherwise blocking former spray orifices 24 will depend at least in part on the material from which the subject injector tip is made, as well as the production environment and future performance and durability requirements.

INDUSTRIAL APPLICABILITY

As alluded to above, one specific remanufacturing application of the present disclosure relates to remanufacturing fuel injectors known as "high-flow" fuel injectors, or having "high-flow" tips. Over the course of a service life, spray orifices in a fuel injector tip, commonly located in a bulb, can experience fluid erosion of their inner walls, enlarging the orifices from a desired orifice size and increasing the relative flow rate thereof. Excess fuel flow due to fluid erosion through one or more orifices in a fuel injector tip can result in poor fuel economy in an associated engine, increased unburned hydrocarbons in the engine exhaust and potentially cause other problems. Many engine operating strategies rely for their success at least partly upon relatively precise control over fuel injection quantities and timing, thus even small deviations from operating specifications in a fuel injector can compromise engine performance. When a particular fuel injector is received after a service life from an end user or other entity, its operation will typically be evaluated, including assessing the relative flow rate and/or orifice size in the injector's tip. Not all spray orifices will necessarily experience fluid erosion at the same rate, and it is thus common to receive fuel injector tips for remanufacturing having some spray orifices which have a diameter and flow rate that is within specifications, while certain of the other spray orifices have eroded to out-of-specification conditions. In any event, where the average spray orifice diameter/flow rate of a given fuel injector tip is greater than a desired diameter/flow rate, the fuel injector tip may be in a high-flow state and thus appropriate for remanufacturing. It was formerly common for at least one third of fuel injector tips of certain types to have a high-flow failure condition, and thus be scrapped, when engines were dismantled for rebuild or remanufacturing. The present disclosure is contemplated to significantly ameliorate this waste and expense.

In still further versions of the present disclosure, injectors having a low-flow state, for example where spray orifices are blocked by material not practicably removable, such as extremely hard, carbonized material, may be remanufactured as described herein. Still other embodiments are contemplated wherein a fuel injector tip having some defect made apparent through testing before ever being placed in service is remanufactured as described herein, as well as embodiments in which an existing tip design has become obsolete or less desirable, and newly manufactured injectors/tips are modified as described herein to create an injector/tip with new specifications. Thus, the present disclosure is not strictly limited to remanufacturing fuel injector tips having a high-flow state or even to injectors and tips removed from service.

Remanufacturing a fuel injector such as fuel injector 10 may take place after receiving a fuel injector and/or fuel injector tip 14 which has been removed from an engine after a service life. As used herein, "service life" is not intended to mean a specific length of time, as certain engines or associated components such as fuel injectors may be dismantled for rebuild or remanufacturing after varying periods of service, depending upon the operating conditions, the type of engine, performance status, convenience, etc. In many instances, a particular engine may be removed from service and its components sent for remanufacturing for reasons unrelated to fuel injector performance. However, remanufacturing of the fuel injectors could be most convenient, and appropriate, at such time as the engine is removed from service even if injector operation has not yet degraded to a point noticeable to an operator or technician. In still other instances, injectors may be returned for remanufacturing for warranty replacement, or for other reasons, at times where no rebuild or remanufacturing of the associated engine is taking place.

Thus, fuel injector tip 14 (and tip 114) will typically be amenable to remanufacturing where at least one of former spray orifices 24 is out-of-specification, for example, where the average orifice size in injector tip 14 prior to remanufacturing is larger than a desired orifice size for a particular line of fuel injectors. Flow rate tests or some other diagnostics might be used to determine that at least one former spray orifice 24 has reached a high-flow state.

Referring to FIG. 4, there is shown diagrammatically an injector tip remanufacturing apparatus 180, including a fixture 200 and a laser apparatus 300. It may be desirable in some instances to use laser apparatus 300 for both blocking former spray orifices 24 and for drilling new spray orifices 26, however, the present disclosure is not thereby limited. Laser apparatus 300 and fixture 200 are shown in FIG. 4 oriented approximately as they might appear where laser apparatus 300 has completed welding shut former spray orifices 24, and has completed laser drilling a first one of new spray orifices 26. In one embodiment, once it is determined that injector tip 14 is appropriate for remanufacturing, injector tip 14 may be placed within fixture 200, then rotated a specified angular amount about axis A of injector tip 14 a plurality of times. This strategy will permit laser apparatus 300 to weld shut each of former spray orifices 24 one at a time at each one of a set of different angular orientations. Where injector tip 14 has four spray orifices to be blocked, fixture 200 might be incrementally rotated approximately 90° between each laser welding event until each of former spray orifices 24 has been blocked. Then, fixture 200 may be indexed a specified angular amount to position virgin material of bulb 30 in a location for drilling a first one of new orifices 26. Where four new spray orifices are to be drilled, the angular indexing amount may be about 45°. Fixture 200 may subsequently be incrementally rotated 90° between each one of a second set of angular orientations such that laser apparatus 300 may drill each of new spray orifices 26 one at a time. Where a different number or configuration of orifices is used, the positioning of fixture 200 may differ from that described with respect to welding, drilling and indexing.

The present disclosure is applicable to manufacturing and remanufacturing fuel injectors without limitation to materials, injector style, etc., for reasons set forth herein. It is contemplated, however, that economic justification for salvaging fuel injector parts may tend to be greatest for relatively large, expensive fuel injectors, certain of which may weigh in excess of twenty pounds each. The prior state of the art remanufacturing of such fuel injectors involved scrapping all high-flow fuel injector tips and replacing them with brand new injector tips.

In addition to avoiding much of the costs associated with equipping remanufactured injector bodies with new tips, time and expense associated with final assembly and injector performance validation may be reduced. Certain fuel injectors have individual parts matched with other parts prior to assembly to achieve desired or optimal performance. Tolerances in manufactured fuel injector components can affect operation, and it is thus often desirable to match individual components having certain characteristics with other components having similar or compensatory characteristics. In other words, a deviation from ideal specifications in a first component such as injector body 12 due to manufacturing tolerances may be compensated for in a second component having a complementary deviation from ideal specifications. The need for identifying components having compensatory variations in structure or operation may be reduced in some instances via application of the teachings herein, as an injector tip initially removed from an injector body may be returned to service with the same injector body. By enabling remanufacturing of fuel injector tips to original specifications rather than simply throwing them away, remanufacturing according to the present disclosure may reduce tip cost for remanufactured injectors by 50% or more.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For instance, while the present description emphasizes remanufacturing fuel injector tips for an application identical to that originally intended, the present disclosure is not thereby limited. Rather than use in the same type of engine from which a given injector is removed, injectors might be modified in the manner described herein to operate in a somewhat different engine or in the same engine but in a different way. For example, the number, distribution, orientation, etc. of the new spray orifices may be changed as compared to the former spray orifices. Further, while welding is discussed extensively as a strategy for blocking former spray orifices, as well as forming new spray orifices, the present disclosure is also not limited in this regard. Vapor deposition, electrodeposition, thin film applications, and various other strategies might be used for blocking the former spray orifices, whereas EDM, conventional drilling and other processes might be used for forming the new spray orifices. Further still, while forming the new orifices in virgin material of injector tips may be desirable in many instances, it may not be necessary, so long as material filling the old orifices has sufficient integrity to permit forming and acceptable operation of new orifices formed therein. Finally, while it is contemplated that blocking former spray orifices and forming new spray orifices may take place from the outside of injector tips, in other embodiments, welding, such as a friction stir welding process, might be used internally to close the former spray orifices from the inside. Other aspects, features and advantages will be apparent upon an examination of the attached drawings and appended claims.

We claim:

1. A method of manufacturing a fuel injector comprising:
blocking a first set of spray orifices in a fuel injector tip defining a longitudinal injector tip axis, including at least partially filling the first set of spray orifices with a material; and
forming a new set of spray orifices in the fuel injector tip which are configured to permit spraying of a fuel out of the fuel injector tip, including forming the new set of spray orifices in regions of the fuel injector tip that are each radially spaced from the first set of spray orifices and the material at least partially filling the first set of spray orifices.

2. The method of claim 1 wherein forming a new set of spray orifices comprises forming a new set having an average diameter less than an average diameter of the first set.

3. The method of claim 2 wherein blocking a first set of spray orifices includes welding the first set of spray orifices shut prior to forming a new set of spray orifices.

4. The method of claim 3 wherein blocking a first set of spray orifices includes melting filler material positioned within the first set of spray orifices.

5. The method of claim 3 wherein blocking a first set of spray orifices includes melting material of the fuel injector tip in regions surrounding the first set of spray orifices and blocking the first set of spray orifices with the melted material.

6. The method of claim 3 wherein welding the first set of spray orifices shut comprises laser welding the first set of spray orifices shut.

7. The method of claim 6 further comprising:
positioning the fuel injector tip at a first set of radial orientations relative to a welding apparatus, wherein blocking the first set of spray orifices comprises blocking one orifice of the first set of spray orifices at each one of the first set of radial orientations; and
positioning the fuel injector tip at a second set of radial orientations relative to a welding apparatus, the second set of radial orientations being offset from the first set of radial orientations, wherein forming the second set of spray orifices comprises forming one of the second set of spray orifices at each one of the second set of radial orientations.

8. A method of remanufacturing and salvaging a fuel injector tip having out-of-specification spray orifices comprising:
receiving a fuel injector tip removed from an engine after a service life, the fuel injector tip having a first set of spray orifices with a first average orifice size;
blocking the first set of spray orifices, including at least partially filling the first set of spray orifices with a material; and
forming a new set of spray orifices in the fuel injector tip having a second average orifice size different from the first average orifice size which are configured to permit spraying of a fuel out of the fuel injector tip;
wherein forming a new set of spray orifices comprises forming the new set of spray orifices in regions of the fuel injector tip that are spaced from the first set of spray orifices and the material at least partially filling the first set of spray orifices.

9. The method of claim 8 wherein blocking the first set of spray orifices includes welding the first set of spray orifices shut via a plurality of welds, and wherein forming a new set of spray orifices includes forming a new set of spray orifices, having an average diameter larger than that of the first set of spray orifices, in regions of the fuel injector tip that are non-overlapping with the plurality of welds.

10. The method of claim 9 wherein forming a new set of spray orifices comprises forming a number of orifices that is the same as a number of orifices of the first set.

11. The method of claim 10 further comprising indexing the fuel injector tip between a first set of radial orientations and a second, different set of radial orientations after blocking the first set of spray orifices and before forming a new set of spray orifices.

12. The method of claim 10 further comprising dismantling a fuel injector that includes the fuel injector tip, prior to blocking the first set of spray orifices.

13. A method of remanufacturing and salvaging a fuel injector tip having out-of-specification spray orifices comprising:
receiving a fuel injector tip removed from an engine after a service life, and having out-of-specification spray orifices;
blocking the out-of-specification spray orifices in the fuel injector tip, including at least partially filling the out-of-specification spray orifices with a material; and
forming a new set of spray orifices in the fuel injector tip which are configured to permit spraying of a fuel out of the fuel injector tip, after blocking the out-of-specification spray orifices;
wherein forming a new set of spray orifices comprises forming the new set of spray orifices in regions of the fuel injector tip that are spaced from the blocked out-of-specification spray orifices and the material at least partially filling the out-of-specification spray orifices.

* * * * *